United States Patent Office 2,877,255
Patented Mar. 10, 1959

2,877,255
BRANCHED SILOXANES

Harold A. Clark, Midland, Mich., assignor to Dow Corning Corporation, Midland, Mich., a corporation of Michigan No Drawing. Application November 29, 1956
Serial No. 624,976

3 Claims. (Cl. 260—448.2)

This invention relates to branched siloxanes containing silicon bonded hydrogen.

It is the object of this invention to produce compositions of matter which are useful as curing agents for phenylvinylsiloxane solventless resins and as foaming agents in room temperature curing siloxane foams.

This invention relates to siloxanes of the formula $R_nSi(OSiMe_2H)_{4-n}$ in which R is methyl or phenyl and $n$ has a value from 0 to 1 inclusive.

The compositions of this invention may be prepared by cohydrolyzing silicon tetrachloride, phenyltrichlorosilane or methyltrichlorosilane with dimethylmonochlorosilane. The cohydrolysis can be carried out in the conventional manner for cohydrolyzing chlorosilanes.

The compositions of this invention which contain a phenyl radical are useful for curing of phenylvinylsiloxane solventless resins in accordance with the method described in applicant's copending application entitled, "Solventless Siloxane Resins," Serial No. 624,975, filed concurrently herewith.

The compositions of this invention which do not contain a phenyl radical are not compatible with said solventless resins but are suitable for use as foaming agents in room temperature curing siloxane foams such as are described in the application of Donald E. Weyer, Serial No. 615,756, filed October 15, 1956.

The following examples are illustrative of this invention.

Example 1

A mixture of 211.5 g. of phenyltrichlorosilane and 425 g. of dimethylmonochlorosilane were placed in a flask and 270 g. of water were added slowly with stirring. The reaction mixture was stirred overnight and then separated, and the hydrolyzate was washed free of acid. The material was then distilled and the compound $PhSi(OSiHMe_2)_3$ was obtained, boiling at 91° C. at 2.2 mm.

Example 2

360 g. of water were added slowly and with stirring to a mixture of 170 g. of silicon tetrachloride and 568 g. of dimethylmonochlorosilane. The mixture was separated and the hydrolyzate was washed with water until neutral and thereafter distilled to give the compound $Si(OSiHMe_2)_4$, boiling 51 to 53° C. at 6 mm.

Example 3

When a mixture of 1 mol of methyltrichlorosilane and 4.5 monodimethylchlorosilane is cohydrolyzed in the manner of Example 1 and the resulting product distilled, the compound $MeSi(OSiHMe_2)_3$ is obtained.

That which is claimed is:

1. A composition having the formula $$R_nSi(OSiHMe_2)_{4-n}$$

in which R is selected from the group consisting of methyl and phenyl radicals and $n$ has a value from 0 to 1 inclusive.

2. A composition of the formula $PhSi(OSiHMe_2)_3$.
3. A composition of the formula $Si(OSiHMe_2)_4$.

References Cited in the file of this patent

UNITED STATES PATENTS

| | | |
|---|---|---|
| 2,306,222 | Patnode | Dec. 22, 1942 |
| 2,510,642 | Krieble | June 6, 1950 |
| 2,637,718 | Rust | May 5, 1953 |